United States Patent
Leduc et al.

(10) Patent No.: US 7,084,200 B2
(45) Date of Patent: Aug. 1, 2006

(54) AQUEOUS DISPERSIONS OF WATER-SOLUBLE POLYMERS OF N-VINYL CARBOXYLIC ACID AMIDES, METHOD FOR THE PRODUCTION THEREOF AND THEIR USE

(75) Inventors: Marc Leduc, Speyer (DE); Stefan Frenzel, Mannheim (DE); Norbert Mahr, Limburgerhof (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 10/495,111

(22) PCT Filed: Nov. 19, 2002

(86) PCT No.: PCT/EP02/12934

§ 371 (c)(1),
(2), (4) Date: May 18, 2004

(87) PCT Pub. No.: WO03/046024

PCT Pub. Date: Jun. 5, 2003

(65) Prior Publication Data

US 2005/0014887 A1    Jan. 20, 2005

(30) Foreign Application Priority Data

Nov. 24, 2001   (DE) ................... 101 57 675

(51) Int. Cl.
*C08F 2/16*   (2006.01)
*C08L 11/02*  (2006.01)

(52) U.S. Cl. ................ 524/458; 524/504; 524/525; 524/534; 524/538

(58) Field of Classification Search ............ 524/458, 524/504, 525, 534, 538
See application file for complete search history.

(56) References Cited

U.S. PATENT DOCUMENTS

| | | | |
|---|---|---|---|
| 5,962,570 A * | 10/1999 | Sato et al. ............... 524/457 |
| 6,048,945 A * | 4/2000 | Denzinger et al. ......... 525/403 |
| 6,541,573 B1 * | 4/2003 | Niessner et al. ......... 525/328.2 |
| 6,770,293 B1 * | 8/2004 | Angel et al. ............. 424/451 |
| 2003/0199642 A1 * | 10/2003 | Schneider et al. |

FOREIGN PATENT DOCUMENTS

| | | |
|---|---|---|
| DE | 196 52 040 | 6/1997 |
| EP | 0 814 099 | 12/1997 |
| EP | 0 859 015 | 8/1998 |
| EP | 1 136 070 | 9/2001 |
| WO | 97/30094 | 8/1997 |
| WO | 98/54234 | 12/1998 |
| WO | 00/27893 | 5/2000 |

* cited by examiner

*Primary Examiner*—Helen L. Pezzuto
(74) *Attorney, Agent, or Firm*—Oblon, Spivak, McClelland, Maier & Neustadt, P.C.

(57) ABSTRACT

Aqueous dispersions of water-soluble polymers of N-vinylcarboxamides, which contain, as a stabilizer, water-soluble, crosslinked graft polymers which are obtainable by free radical polymerization of compounds having at least two ethylenically unsaturated double bonds in the presence of polyalkylene glycols, are prepared by free radical polymerization of N-vinylcarboxamides in an aqueous medium in the presence of said stabilizers and are used as drainage aids, flocculants and retention aids, as wet and dry strength agents and as fixing agents in papermaking.

19 Claims, No Drawings

AQUEOUS DISPERSIONS OF WATER-SOLUBLE POLYMERS OF N-VINYL CARBOXYLIC ACID AMIDES, METHOD FOR THE PRODUCTION THEREOF AND THEIR USE

BACKGROUND OF THE INVENTION

1. Field of the Invention

The present invention relates to aqueous dispersions of water-soluble polymers of N-vinylcarboxamides, processes for the preparation of the dispersions in the presence of stabilizers and the use of the dispersions as drainage aids, flocculants and retention aids, as wet and dry strength agents and as fixing agents in papermaking.

2. Description of the Background

EP-B-0.814 099 discloses a process for the preparation of aqueous dispersions of a water-soluble cationic polymer, in which an aqueous dispersion of a polymer containing vinylformamide units, which dispersion contains neutral salts, is hydrolyzed with an acid in an aqueous medium with addition of nitrates. The resulting aqueous dispersions of polymers containing vinylamine units have a high neutral salt content.

WO-A-97/30094 discloses a process for the preparation of dispersions of water-soluble cationic vinyl polymers. The polymerization of the water-soluble monomers is effected in aqueous salt solutions in the presence of stabilizers which consist of a water-soluble graft copolymer which contains polyethylene oxide as a grafting base and cationic vinyl monomers as grafted-on side chains.

WO-A-98/54234 discloses aqueous dispersions of water-soluble N-vinylcarboxamides. The dispersions are prepared by polymerizing N-vinylcarboxamides in an aqueous medium in the presence of water-soluble salts and water-soluble polymeric stabilizers. The polymeric stabilizers used are, for example, polyvinyl alcohol and partially hydrolyzed polyvinyl acetates.

WO-A-00/27893 relates to aqueous dispersions of water-soluble polymers of N-vinylcarboxamides, processes for their preparation and their use as drainage aids, flocculants and retention aids, as wet and dry strength agents and as fixing agents in papermaking. The polymeric dispersants, e.g. polyethylene glycol, polypropylene glycol, polyvinyl acetate, polyvinyl alcohol, polyvinylpyridine, polyvinylimidazole and polydiallyldimethylammonium chloride, are used for stabilizing the dispersions.

SUMMARY OF THE INVENTION

It is an object of the present invention to provide further dispersions of water-soluble polymers of N-vinylformamide.

We have found that this object is achieved, according to the invention, by aqueous dispersions of water-soluble polymers of N-vinylcarboxamides if the dispersions contain, as a stabilizer, water-soluble, crosslinked graft polymers which are obtainable by free radical polymerization of compounds having at least two ethylenically unsaturated double bonds in the presence of polyalkylene glycols.

DETAILED DESCRIPTION OF THE PREFERRED EMBODIMENTS 100 parts by weight of the dispersions contain, for example, (a) from 5 to 60 parts by weight of a water-soluble polymer of an N-vinylcarboxamide and (b) from 0.1 to 30 parts by weight of at least one crosslinked graft polymer. The water-soluble polymers of N-vinylcarboxamides are preferably based on homo- and copolymers which contain polymerized units of the formula

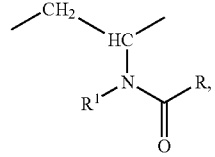

where R and $R^1$ are H or $CH_3$. The polymers are prepared by homo- or copolymerization of, for example, N-vinylformamide, N-vinylacetamide, N-vinyl-N-methylacetamide or N-vinyl-N-methylformamide. Among the N-vinylcarboxamides, N-vinylformamide is preferably used.

The water-soluble polymers containing N-vinylcarboxamide units can, if required, contain from 1 to 80, preferably from 5 to 30, % by weight of further monomers as copolymerized units. Such monomers are, for example, monoethylenically unsaturated carboxylic acids of 3 to 8 carbon atoms, such as acrylic acid, methacrylic acid, dimethacrylic acid, ethacrylic acid, maleic acid, citraconic acid, methylenemalonic acid, allylacetic acid, vinylacetic acid, crotonic acid, fumaric acid, mesaconic acid and itaconic acid. From this group of monomers, acrylic acid, methacrylic acid, maleic acid or a mixture of said carboxylic acids is preferably used. The monoethylenically unsaturated carboxylic acids are used either in the form of the free acids or in the form of their alkali metal, alkaline earth metal or ammonium salts in the copolymerization. Sodium hydroxide solution, potassium hydroxide solution, sodium carbonate, potassium carbonate, sodium bicarbonate, magnesium oxide, calcium hydroxide, calcium oxide, gaseous or aqueous ammonia, triethylamine, ethanolamine, diethanolamine, triethanolamine, morpholine, diethylenetriamine or tetraethylenepentamine is preferably used for neutralizing the free carboxylic acids.

Further suitable comonomers are, for example, the esters, amides and nitriles of the abovementioned carboxylic acids, e.g. methyl acrylate, ethyl acrylate, methyl methacrylate, ethyl methacrylate, hydroxyethyl acrylate, hydroxypropyl acrylate, hydroxybutyl acrylate, hydroxyethyl methacrylate, hydroxypropyl methacrylate, hydroxyisobutyl acrylate, hydroxyisobutyl methacrylate, monomethyl maleate, dimethyl maleate, monoethyl maleate, diethyl maleate, 2-ethylhexyl acrylate, 2-ethylhexyl methacrylate, acrylamide, methacrylamide, N-dimethylacrylamide, N-tert-butylacrylamide, acrylonitrile, methacrylonitrile, dimethylaminoethyl acrylate, diethylaminoethyl acrylate, diethylaminoethyl methacrylate and the salts of the last-mentioned basic monomers with carboxylic acids or mineral acids and the quaternized products of the basic (meth)acrylates.

Acrylamidoglycolic acid, vinylsulfonic acid, allylsulfonic acid, methallylsulfonic acid, styrenesulfonic acid, 3-sulfopropyl acrylate, 3-sulfopropyl methacrylate and acrylamidomethylpropanesulfonic acid and monomers containing phosphonic acid groups, such as vinylphosphonic acid, allylphosphonic acid and acrylamidomethylpropanephosphonic acid, are also suitable as other copolymerizable monomers. The monomers containing acid groups can be used in the polymerization in the form of the free acid groups and in a form partly or completely neutralized with bases.

Further suitable copolymerizable compounds are N-vinylpyrrolidone, N-vinylcaprolactam, N-vinylimidazole, N-vinyl-2-methylimidazole, N-vinyl-4-methylimidazole, diallylammonium chloride, vinyl acetate, vinyl propionate and styrene. It is of course also possible to use mixtures of said monomers. If, when polymerized alone, said monomers do not give water-soluble polymers, the polymers containing N-vinylcarboxamide units contain these comonomers as polymerized units only in amounts such that the copolymers are still water-soluble. In contrast to water-in-oil polymer emulsions, no organic solvents are required for the novel aqueous dispersions. As is evident from the prior art stated at the outset, concentrated solutions of inorganic salts are a conventional medium for preparing aqueous dispersions of water-soluble polymers. As a result, the known dispersions contain a very high salt load. In contrast, the novel aqueous dispersions of water-soluble polymers are virtually salt-free. The aqueous dispersions of water-soluble polymers of N-vinylformamide, N-vinyl-N-methylformamide, N-vinyl-N-methylacetamide and/or N-vinylacetamide preferably have high polymer contents and preferably contain polymers having high molar masses and at the same time have a low viscosity. The molar masses $M_w$ of the polymers containing N-vinylcarboxamide units are, for example, from $5 \times 10^4$ to $1 \times 10^7$, preferably from $2 \times 10^5$ to $1 \times 10^6$.

The aqueous dispersions contain, as a stabilizer, crosslinked graft polymers which are composed of a polyalkylene glycol backbone and, grafted thereon, polymers of a compound containing at least two ethylenically unsaturated double bonds. In the aqueous polymerization medium, the crosslinked graft polymers act, for example, as a stabilizer and/or as a precipitating agent for the resulting polymer particles. They are referred to in the following text as stabilizers. Such stabilizers are obtainable, for example, by polymerizing from 0.01 to 10 parts by weight of a compound containing at least two ethylenically unsaturated double bonds in the presence of 100 parts by weight of at least one polyalkylene glycol. The graft polymerization can, if required, also be carried out in the presence of monoethylenically unsaturated comonomers. For example, (i) from 0.01 to 10 parts by weight of a compound containing at least two ethylenically unsaturated double bonds and (ii) from 0 to 90 parts by weight of at least one monoethylenically unsaturated monomer can be polymerized in the presence of 100 parts by weight of at least one polyalkylene glycol in order to prepare the stabilizers.

Polyalkylene glycols are to be understood as meaning compounds which have a number average molecular weight of at least 300 and which can be described, for example, with the aid of the following formula:

$R^{10}$ is hydrogen, $C_1$–$C_{24}$-alkyl or $R^{9-}C(=O)$—;
A is —$C(=O)$—O—, —$C(=O)$—B—$C(=O)$—O— or —$C(=O)$—NH—B—NH—$C(=O)$—O—;
B is —$(CH_2)_t$— or unsubstituted or substituted arylene;
n is from 1 to 8;
s is from 0 to 500;
t from 1 to 12;
u from 1 to 5 000;
v is from 0 to 5 000;
w is from 0 to 5 000;
x is from 1 to 5 000;
y is from 0 to 5 000;
z is from 0 to 5 000.

Such compounds are known from the prior art, cf. WO-A-00/18375. In general, polyalkylene glycols of the formula II, selected from the group consisting of polyalkylene oxides based on ethylene oxide, propylene oxide and butylene oxide, and polytetrahydrofuran are used as the grafting base. Depending on the type of monomer building blocks, polymers having the following structural units are obtained.

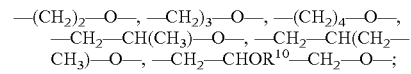

These may be both homopolymers and copolymers, it being possible for the copolymers to be random copolymers or block polymers.

The terminal primary hydroxyl groups of the polyalkylene glycols prepared on the basis of alkylene oxides may be both present in free form and etherified or esterified at one or both ends with alcohols having a chain length of $C_1$–$C_{24}$ or with carboxylic acids having a chain length of $C_1$–$C_{24}$. However, they can also be exchanged for primary amino groups by reductive amination with hydrogen-ammonia mixtures under pressure or converted into aminopropyl terminal groups by cyanoethylation with acrylonitrile and hydrogenation.

Examples of alkyl radicals $R^1$ and $R^8$ to $R^{10}$ are branched or straight $C_1$–$C_{24}$-alkyl chains, preferably methyl, ethyl, n-propyl, 1-methylethyl, n-butyl, 1-methylpropyl, 2-methylpropyl, 1,1-dimethylethyl, n-pentyl, 1-methylbutyl, 2-methylbutyl, 3-methylbutyl, 2,2-dimethylpropyl, 1-ethylpropyl, n-hexyl, 1,1-dimethylpropyl, 1,2-dimethylpropyl, 1-methylpentyl, 2-methylpentyl, 3-methylpentyl, 4-methylpentyl, 1,1-dimethylbutyl, 1,2-dimethylbutyl, 1,3-dimethylbutyl, 2,2-dimethylbutyl, 2,3-dimethylbutyl, 3,3-dimethylbutyl, 1-ethylbutyl, 2-ethylbutyl, 1,1,2-trimethylpropyl, 1,2,2-trimethylpropyl, 1-ethyl-1-methylpropyl, 1-ethyl-2-methylpropyl, n-heptyl, 2-ethylhexyl, n-octyl, n-nonyl,

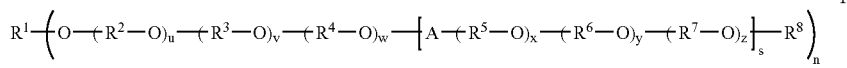

where, independently of one another,
$R^1$ is hydrogen, $NH_2$, $C_1$–$C_{24}$-alkyl, $R^{9-}C(=O)$—, $R^9$—NH—$C(=O)$— or a polyalcohol radical;
$R^8$ is hydrogen, $NH_2$, $C_1$–$C_{24}$-alkyl, $R^{9-}C(=O)$— or $R^9NH$—$C(=O)$;
$R^2$ to $R^7$ are
—$(CH_2)_2$—, —$(CH_2)_3$—, —$(CH_2)_4$—, —$CH_2$—CH($CH_3$)—, —$CH_2$—CH($CH_2$–$CH_3$)— or —$CH_2$—CHOR$^{10}$—$CH_2$—;
$R^9$ is $C_1$–$C_{24}$-alkyl;

n-decyl, n-undecyl, n-dodecyl, n-tridecyl, n-tetradecyl, n-pentadecyl, n-hexadecyl, n-heptadecyl, n-octadecyl, n-nonadecyl or n-eicosyl.

Branched or straight $C_1$–$C_{12}$-alkyl, particularly preferably $C_1$–$C_6$-alkyl, chains may be mentioned as preferred members of the abovementioned alkyl radicals.

The number average molecular weight of the polyalkylene glycols is less than 500 000, preferably from 300 to 100 000, particularly preferably from 500 to 20 000, very particularly preferably from 800 to 15 000.

Advantageously homopolymers of ethylene oxide or copolymers containing from 40 to 99% by weight of ethylene oxide units are used. For the ethylene oxide polymers which are preferably to be used, the amount of polymerized ethylene oxide is thus from 40 to 100 mol %. Suitable comonomers for these copolymers are propylene oxide, butylene oxide and/or isobutylene oxide. For example, copolymers of ethylene oxide and propylene oxide, copolymers of ethylene oxide and butylene oxide and copolymers of ethylene oxide, propylene oxide and at least one butylene oxide are suitable. The ethylene oxide content of the copolymers is preferably from 40 to 99 mol %, the propylene oxide content from 1 to 60 mol % and the butylene oxide content from 1 to 30 mol %. In addition to straight-chain homo- or copolymers, branched ones may also be used as the grafting base.

Branched polymers are also suitable as the grafting base. They can be prepared by subjecting ethylene oxide and, if required, also propylene oxide and/or butylene oxides to an addition reaction with, for example, low molecular weight polyalcohol radicals (=$R^1$ in the formula 1, e.g. pentaerythritol or glycerol or with sugars or sugar alcohols, such as sucrose, D-sorbitol and D-mannitol).

It is possible to form polymers in which at least one, preferably from one to eight, particularly preferably from one to five, of the hydroxyl groups present in the polyalcohols can be linked in the form of an ether bond to the following polyether radical P, according to formula II

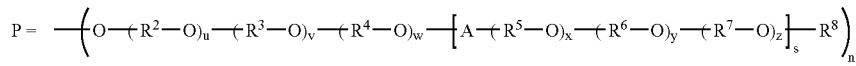

n = 1 to 8

The alkylene oxide units can be randomly distributed in the polymer or may be present in the polymer in the form of blocks.

However, it is also possible to use polyesters of polyalkylene oxides and aliphatic $C_1$–$C_{12}$-dicarboxylic acids, preferably $C_1$–$C_6$-dicarboxylic acids, or aromatic dicarboxylic acids, e.g. oxalic acid, succinic acid, adipic acid or terephthalic acid, having molar masses of from 1,500 to 25,000, described in EP-A-0 743 962, as the grafting base.

It is furthermore possible to use polycarbonates of polyalkylene oxides, which polycarbonates have been prepared by phosgenation, or polyurethanes of polyalkylene oxides and aliphatic $C_1$–$C_{12}$-diisocyanates, preferably $C_1$–$C_6$-diisocyanates, or aromatic diisocyanates, e.g. hexamethylene diisocyanate or phenylene diisocyanate, as the grafting base.

The abovementioned polyesters, polycarbonates or polyurethanes may contain up to 500, preferably up to 100, alkylene oxide units, it being possible for the alkylene oxide units to consist both of homopolymers and of copolymers of different alkylene oxides.

Suitable compounds having at least two ethylenically unsaturated double bonds, which are also referred to as crosslinking agents, are, for example, acrylates, methacrylates, allyl ethers or vinyl ethers of at least dihydric alcohols. The OH groups of the parent alcohol may all be etherified or esterified (e.g. divinyl ether of 1,4-butanediol) or some of them may be etherified or esterified; however, the crosslinking agents contain at least two ethylenically unsaturated groups.

Examples of the parent alcohols are dihydric alcohols, such as 1,2-ethanediol, 1,2-propanediol, 1,3-butanediol, 2,3-butanediol, 1,4-butanediol, but-2-ene-1,4-diol, 1,2-pentanediol, 1,5-pentanediol, 1,2-hexanediol, 1,5-hexanediol, 1,10-decanediol, 1,2-dodecanediol, 1,12-dodecanediol, neopentylglycol, 3-methylpentane-1,5-diol, 2,5-dodecanediol, 1,12-dodecanediol, neopentylglycol, 3-methylpentane-1,5-diol, 2,5-dimethyl-1,3-hex anediol, 2,2,4-trimethyl-1,3-pentanediol, 1,2-cyclohexanediol, 1,4-cyclohexanediol, 1,4-bis(hydroxymethyl)cyclohexane, neopentylglycol monohydroxypivalate, 2,2-bis(4-hydroxyphenyl)propane, 2,2-bi[4-(2-hydroxypropyl)phenyl]propane, diethylene glycol, triethylene glycol, tetraethylene glycol, dipropylene glycol, tripropylene glycol, tetrapropylene glycol, 3-thiopentane-1,5-diol, and polyethylene glycols, polypropylene glycols and polytetrahydrofurans having molecular weights of, in each case, from 200 to 10 000. In addition to the homopolymers of ethylene oxide or of propylene oxide, block copolymers of ethylene oxide or propylene oxide or copolymers which contain incorporated ethylene oxide or propylene oxide groups can also be used. Examples of parent alcohols having more than two OH groups are trimethylolpropane, glycerol, pentaerythritol, 1,2,5-pentanetriol, 1,2,6-hexanetriol, triethoxycyanuric acid, sorbitan, sugars, such as sucrose, glucose and mannose. Of course, the polyhydric alcohols can also be used in the form of the corresponding ethoxylates or propoxylates, after reaction with ethylene oxide or propylene oxide. The polyhydric alcohols can also first be converted into the corresponding glycidyl ethers by reaction with epichlorohydrin.

Further suitable crosslinking agents are the vinyl esters or the esters of monohydric, unsaturated alcohols with ethylenically unsaturated $C_3$–$C_6$-carboxylic acids, for example acrylic acid, methacrylic acid, itaconic acid, maleic acid or fumaric acid. Examples of such alcohols are ally alcohol, 1-buten-3-ol, 5-hexen-1-ol, 1-octen-3-ol, 9-decen-1-ol, dicyclopentenyl alcohol, 10-undecen-1-ol, cinnamyl alcohol, citronellol, crotyl alcohol or cis-9-octadecen-1-ol. However, the monohydric, unsaturated alcohols can also be esterified with polybasic carboxylic acids, for example malonic acid, tartaric acid, trimellitic acid, phthalic acid, terephthalic acid, citric acid or succinic acid.

Further suitable crosslinking agents are esters of unsaturated carboxylic acids with the polyhydric alcohols described above, for example of oleic acid, crotonic acid, cinnamic acid or 10-undecanoic acid.

Other suitable crosslinking agents are straight-chain or branched, linear or cyclic, aliphatic or aromatic hydrocarbons which have at least two double bonds, e.g. divinylbenzene, divinyltoluene, 1,7-octadiene, 1,9-decadiene, 4-vinyl-1-cyclohexene, trivinylcyclohexane or polybutadienes having molecular weights of from 200 to 20 000.

Also suitable as crosslinking agents are the acrylamides, methacrylamides and N-allylamines of at least difunctional amines. Such amines are, for example, 1,2-diaminomethane, 1,2-diaminoethane, 1,3-di aminopropane, 1,4-diaminobutane, 1,6-diaminohexane, 1,12-dodecanediamine, piperazine, diethylenetriamine or isophoronediamine. The amides of allylamine and unsaturated carboxylic acids, such as acrylic acid, methacrylic acid, itaconic acid or maleic acid, or at least dibasic carboxylic acids, as described above, are also suitable. Furthermore, triallylamine and triallylmonoalkylammonium salts, e.g. triallylmethylammonium chloride or methylsulfate, are suitable as crosslinking agents.

N-Vinyl compounds of urea derivatives, at least difunctional amides, cyanurates or urethanes, for example of urea, ethyleneurea, propyleneurea or tartaramide, e.g. N,N'-divinylethyleneurea or N,N'-divinylpropyleneurea, are also suitable.

Further suitable crosslinking agents are divinyldioxane, tetraallylsilane or tetravinylsilane. Preferably used crosslinking agents are those which are soluble in the monomer mixture. Particularly preferably used crosslinking agents are, for example, pentaerythrityl triallyl ether, methylenebisacrylamide, triallylamine and triallylalkylammonium salts, divinylimidazole, N,N'-diviinylethyleneurea, reaction products of polyhydric alcohols with acrylic acid or methacrylic acid, methacrylates and acrylates of polyalkylene oxides or polyhydric alcohols which have been reacted with ethylene oxide and/or propylene oxide, for example acrylates of glycol, butanediol, trimethylolpropane or glycerol or acrylates of glycol, butanediol, trimethylolpropane or glycerol reacted with ethylene oxide. Very particularly preferred crosslinking agents are pentaerythrityl triallyl ether, methylenebisacrylamide and N,N'-divinylethyleneurea.

For the preparation of the stabilizers, the crosslinking agents are polymerized either alone or together with monoethylenically unsaturated monomers in the presence of polyalkylene glycols. Monoethylenically unsaturated compounds which may be used are, for example, all comonomers which are mentioned above as comonomers for N-vinylcarboxamides, e.g. acrylic acid, acrylates of monohydric alcohols, acrylamide, acrylonitrile, N-vinylformamide, vinyl acetate and/or vinyl propionate. For example, up to 90, preferably up to 50, in particular up to 25, parts by weight of at least one comonomer are used, based on 100 parts by weight of a polyalkylene glycol.

The present invention also relates to a process for the preparation of aqueous dispersions of water-soluble polymers of N-vinylcarboxamides by free radical polymerization of N-vinylcarboxamides in an aqueous medium in the presence of stabilizers, wherein water-soluble, crosslinked graft polymers which are obtainable by free radical polymerization of compounds having at least two ethylenically unsaturated double bonds in the presence of polyalkylene glycols are used as the stabilizer. In this process, for example, N-vinylformamide is polymerized, if required together with other monoethylenically unsaturated monomers, in the presence of stabilizers which are obtainable by graft polymerization of (i) from 0.01 to 10 parts by weight of a compound containing at least two ethylenically unsaturated double bonds and (ii) from 0 to 90 parts by weight of at least one monoethylenically unsaturated monomer in the presence of 100 parts by weight of at least one polyalkylene glycol.

Preferably used stabilizers are graft polymers which are obtainable by polymerizing N,N'-divinylethyleneurea, pentaerythrityl triallyl ether, methylenebisacrylamide and/or polyhydric alcohols which have been at least diesterified with acrylic acid or methacrylic acid, in the presence of polyethylene glycol, polypropylene glycol and/or block copolymers of ethylene oxide and propylene oxide.

The aqueous dispersions contain, for example, from 1 to 50, preferably from 5 to 40, parts by weight, based on 100 parts by weight of water, of at least one stabilizer. In a preferred embodiment, from 5 to 80 parts by weight of N-vinylformamide and/or N-vinylacetamide, if required together with other monoethylenically unsaturated monomers which form water-soluble polymers therewith, and from 1 to 50 parts by weight of at least one polymeric stabilizer, are polymerized in 100 parts by weight of water at from 30 to 95° C. in the presence of from 0.001 to 5.0% by weight, based on the monomers used, of initiators, in order to prepare N-vinylcarboxamides.

In the particularly preferred embodiment of the process, from 10 to 50 parts by weight of N-vinylformamide, if required together with other monoethylenically unsaturated monomers which form water-soluble polymers therewith, and from 5 to 40 parts by weight of at least one polymeric stabilizer are polymerized in 100 parts by weight of water at from 40 to 70° C. with from 0.5 to 2.0% by weight, based on the monomers used in the polymerization, of azo compounds which decompose into free radicals under the polymerization conditions.

According to the invention, the monomers are subjected to free radical polymerization, i.e. polymerization initiators which form free radicals under the polymerization conditions are used. Suitable compounds of this type are, for example, hydrogen peroxide, peroxides, hydroperoxides, redox catalysts and nonoxidizing initiators, such as azo compounds, which decompose into free radicals under the polymerization conditions. Suitable azo compounds are, for example, 2,2'-azobis(2-amidinopropane) dihydrochloride, 2,2'-azobis(N,N'-dimethyleneisobutyramidine) dihydrochloride, 2,2'-azobis(2,4-dimethylvaleronitrile), 2,2'-azobis[2-methyl-N-(2-hydroxyethyl)propionamide] or 2,2'-azobisisobutyronitrile. It is of course also possible to use mixtures of different initiators.

If dispersions of polymers having low molecular weights are desired, for example, the amounts of initiator which are usually used in the polymerization can be increased, so that it is also possible to use amounts of initiators which are outside the above-mentioned range for the amounts of initiator. Aqueous dispersions of low molecular weight homo- and copolymers of the suitable vinylcarboxamides can also be obtained by carrying out the polymerization in the presence of the polymerization regulators and, if required, simultaneously a larger amount of initiators then is usually required. Suitable polymerization regulators are, for example, compounds containing sulfur in bound form, such as dodecyl mercaptan, thioglycolic acid, thioacetic acid and mercaptoalcohols, such as mercaptoethanol, mercaptopropanols and mercaptobutanols. In addition, formic acid, isopropanol and hydrazine in the form of salts with strong acids may also be used as polymerization regulators.

The molecular weights of the polymers present in the dispersed form can also be characterized with the aid of the K values according to Fikentscher. The K values are up to 300, preferably from 130 to 180. From light scattering experiments, it follows that a K value of 250 corresponds to an average molecular weight of the polymers of about 7 000 000 Dalton.

Polymers containing vinylcarboxamide units can be hydrolyzed to give polymers containing vinylamine units. Thus, polymers containing vinylamine units are formed in each case, for example, by eliminating formyl groups from polymers containing N-vinylformamide units and by eliminating the $CH_3$—$CO$— group from polymers containing N-vinylacetamide units. The elimination can be carried out partly or completely. If the hydrolysis is carried out in the presence of acids, the vinylamine units of the polymers are present as ammonium salts. However, the hydrolysis can also be effected with the aid of bases, for example of metal hydroxides, in particular of alkali metal and alkaline earth metal hydroxides. Sodium hydroxide or potassium hydroxide is preferably used. In particular cases, the hydrolysis can also be carried out with the aid of ammonia or amines. In the case of the hydrolysis in the presence of bases, the vinylamine units are present in the form of the free bases.

Suitable hydrolyzing agents are preferably mineral acids, such as hydrogen halides, which may be used in gaseous form or as an aqueous solution. Concentrated hydrochloric acid, sulfuric acid, nitric acid or phosphoric acid and organic acids, such as $C_1$- to $C_5$-carboxylic acids and aliphatic or aromatic sulfonic acids are preferably used. For example, from 0.05 to 2, in particular from 1 to 1.5, mole equivalents of an acid are required per equivalent of formyl groups in the polymers containing polymerized N-vinylformamide units. The hydrolysis of the N-vinylformamide units takes place significantly more rapidly than that of the polymers having N-vinylacetamide units. If copolymers of the suitable vinylcarboxamides with other comonomers are subjected to the hydrolysis, the comonomer units contained in the copolymer can also be chemically modified. For example, vinyl alcohol units form from vinyl acetate units. In the hydrolysis, acrylic acid units form from methyl acrylate units and acrylamide or acrylic acid units are formed from acrylonitrile units. From 5 to 100%, preferably from 10 to 40%, of the N-vinylformamide and/or vinylacetamide units of the polymers (A) can be hydrolyzed. Although the aqueous dispersions of water-soluble N-vinylcarboxamides go into solution on dilution with water, surprisingly the dispersion is not destroyed during the hydrolysis. The particle diameter of the hydrolyzed particles before and after the hydrolysis is, for example, from 0.1 to 50 mm.

The resulting aqueous dispersions of N-vinylcarboxamides form clear aqueous polymer solutions on dilution with water. The viscosity of the dispersions is, for example, from 300 to 50 000, preferably from 500 to 20 000, mPa·s (determined in a Brookfield viscometer at 20° C., spindle no. 4 and 20 rpm). The mean particle size of the dispersions which contain polymers having units of N-vinylformamide, N-vinylacetamide and/or N-methyl-N-vinylacetamide is in general from 0.1 to 50 mm.

The dispersions described above, i.e. the unhydrolyzed as well as the hydrolyzed aqueous dispersions of water-soluble N-vinylcarboxamides, are used as drainage aids, flocculants and retention aids, as wet and dry strength agents and as fixing agents in papermaking. The cationic polymers can also be used as flocculants for wastewaters in the dewatering of sewage sludge, as flocculants in ore dressing and in tertiary oil production or as dispersants, for example for inorganic and organic pigments, dyes, cement or crop protection agents. The unhydrolyzed as well as the hydrolyzed aqueous dispersions can moreover be used as strength agents for paper, as fixing agents for soluble and insoluble interfering substances in papermaking and as paper coating compositions. They can furthermore be used as coating material for fertilizers and crop protection agents and as floor care compositions. Said aqueous hydrolyzed or unhydrolyzed polymer dispersions can also be used in cosmetics, for example for cosmetic hair preparations, such as conditioners or hair setting compositions, or as conditioners for skin care compositions and as thickeners for cosmetic formulations, and furthermore as a component of cosmetic preparations for oral hygiene.

The K values were determined according to H. Fikentscher, Cellulose-Chemie, 13 (1932), 58–64 and 71–74, in aqueous solution at 25° C. and concentrations which are from 0.1 to 5% by weight, depending on the K value range. The viscosity of the dispersions was measured in each case in a Brookfield viscometer using spindle no. 4 at 20 rpm and 20° C. The data in % are percent by weight.

EXAMPLES

Preparation of Stabilizer A 464 g of polyethylene glycol (number average molecular weight 1 500) were heated to 120° C. in a nitrogen atmosphere with continuous thorough mixing. Thereafter, 7.28 g of N,N'-divinylethyleneurea were added and the mixture was heated to 140° C. After this temperature had been reached, a solution of 7 g of tert-butyl peroxide in 20 g of octane was metered in in the course of one hour. Thereafter, the reaction mixture was heated for a further hour to 140° C., cooled to room temperature and diluted by adding 500 g of water. A clear aqueous solution having a polymer content of 47.4% by weight was obtained.

Example 1

316.5 g of the 47.4% strength aqueous solution of the stabilizer A, 2.5 g of sodium dihydrogen phosphate and 250 g of N-vinylformamide were dissolved in 429 g of water. The pH of the clear aqueous solution was brought to 6.75 by adding 50% strength aqueous sodium hydroxide solution. Thereafter, nitrogen was passed through the aqueous solution for 10 minutes, 1.25 g of 2,2'-azobis(2-methylpropionamidine) dihydrochloride were added and the reaction mixture was heated to 50° C. under a nitrogen atmosphere and stirred for 7 hours at the stated temperature. Thereafter, 0.5 g of 2,2'-azobis[2-(2-imidazolin-2-yl)propane] dihydrochloride was added and the mixture was stirred for a further 3 hours at 50° C. and then cooled to room temperature. A stable white suspension having a viscosity of 900 mPa·s (Brookfield viscometer, spindle 4, 20 rpm) was obtained. The mean particle diameter of the dispersed polymers was 10 mm. The polymer thus prepared had a K value of 142.

Comparative Example 1

150 g of polyethylene glycol (number average molecular weight 1 500), 2.5 g of sodium dihydrogen phosphate and 250 g of N-vinylformamide were dissolved in 596 g of water. The pH of the clear aqueous solution was brought to 6.75 by adding 50% strength aqueous sodium hydroxide solution. After nitrogen had been passed through the mixture for 10 minutes, 1.25 g of 2,2'-azobis(2-methylpropionamidine) dihydrochloride were added and the reaction mixture was heated to 50° C. under a nitrogen atmosphere and stirred for 7 hours at this temperature. 0.5 g of 2,2'-azobis[2-(2-imidazolin-2-yl)propane] dihydrochloride was metered in and the mixture was stirred for a further 3 hours at 50° C. and then cooled to room temperature. Agglomeration of the polymer was observed as early as during the last 3 hours of the polymerization. An agglomerated polymer mass was obtained on cooling to room temperature.

We claim:

1. An aqueous dispersion of water-soluble polymers, comprising:
   a water-soluble polymer consisting of at least one polymer of at least one N-vinylcarboxamide, optionally with a comonomer selected from the group consisting of monoethylenically unsaturated carboxylic acids of 3 to 8 carbon atom content, salts thereof, an unsaturated nitrile, an unsaturated amide, an ester of an unsaturated acid, an unsaturated group containing sulfonic acid compound, an unsaturated group containing phosphonic acid compound, N-vinylpyrrolidone, N-vinylcaprolactam, N-vinylimidazole, N-vinyl-2-methylimidazole, N-vinyl-4-methylimidazole, diallylammonium chloride and styrene and, as a stabilizer, water-soluble crosslinked graft polymers which are prepared by the free radical polymerization of compounds having at least two ethylenically unsaturated double bonds in the presence of polyalkylene glycols.

2. The aqueous dispersion as claimed in claim 1, wherein 100 parts by weight of the dispersion contain (a) from 5 to 60 parts by weight of a water-soluble polymer of an N-vinylcarboxamide and (b) from 0.1 to 30 parts by weight of at least one crosslinked graft polymer.

3. The aqueous dispersion as claimed in claim 1, wherein the water-soluble polymer contains units of N-vinylformamide, N-vinylacetamide, N-methyl-N-vinylacetamide or combinations thereof and has a mean particle size ranging from 0.1 to 50 mm.

4. The aqueous dispersion as claimed in claim 1, wherein the at least one polymer of at least one N-vinylcarboxamide is selected from the group consisting of the homopolymers of N-vinylformamide, the copolymers of N-vinylformamide with other monoethylenically unsaturated monomers and the polymers obtainable in each case therefrom by hydrolysis and containing vinylamine units.

5. The aqueous dispersion as claimed in claim 1, wherein the viscosity of the dispersion ranges from 300 to 50 000 mPa·s.

6. The aqueous dispersion as claimed in claim 1, which contains, as a stabilizer, water-soluble, crosslinked graft polymers which are prepared by polymerization of 0.01 to 10 parts by weight of a compound containing at least two ethylenically unsaturated double bonds in the presence of 100 parts by weight of at least one polyalkylene glycol.

7. The aqueous dispersion as claimed in claim 1, which contains, as a stabilizer, water-soluble, crosslinked graft polymers which are prepared by polymerization of (i) from 0.01 to 10 parts by weight of a compound containing at least two ethylenically unsaturated double bonds and (ii) from 0 to 90 parts by weight of at least one monoethylenically unsaturated monomer in the presence of 100 parts by weight of at least one polyalkylene glycol.

8. A process for the preparation of aqueous dispersions of water-soluble polymers of N-vinylcarboxamides, comprising:
free radically polymerizing at least one N-vinylcarboxamide and optionally with a comonomer selected from the group consisting of monoethylenically unsaturated carboxylic acids of 3 to 8 carbon atom content, salts thereof, an unsaturated nitrile, an unsaturated amide, an ester of an unsaturated acid, an unsaturated group containing sulfonic acid compound, an unsaturated group containing phosphonic acid compound, N-vinylpyrrolidone, N-vinylcaprolactam, N-vinylimidazole, N-vinyl-2-methylimidazole, N-vinyl-4-methylimidazole, diallylammonium chloride and styrene in an aqueous medium in the presence of at least one stabilizer, which is a water-soluble, crosslinked graft polymer which is prepared by free radical polymerization of at least one compound having at least two ethylenically unsaturated double bonds in the presence of at least one polyalkylene glycol.

9. The process as claimed in claim 8, wherein said N-vinylcarboxamide is N-vinylformamide which is polymerized, optionally together with at least one other monoethylenically unsaturated monomer, in the presence of compounds which are prepared by graft polymerization of (i) from 0.01 to 10 parts by weight of a compound containing at least two ethylenically unsaturated double bonds and (ii) from 0 to 90 parts by weight of at least one monoethylenically unsaturated monomer in the presence of 100 parts by weight of at least one polyalkylene glycol.

10. The process as claimed in claim 8, wherein said stabilizer is a graft polymer which is prepared by polymerization of N,N'-divinylethyleneurea, pentaerythrityl triallyl ether, methylenebisacrylamide, polyhydric alcohols at least diesterified with acrylic acid or methacrylic acid or combinations thereof in the presence of polyethylene glycol, polypropylene glycol, block copolymers of ethylene oxide and propylene oxide or combinations thereof.

11. The process as claimed in claim 8, wherein said N-vinylcarboxamide is N-vinylformamide and aqueous dispersions of polymers of N-vinylformamide are converted into aqueous dispersions containing vinylamine units, with elimination of some or all of the formyl groups from the polymers containing vinylformamide units.

12. The aqueous dispersion as claimed in claim 5, wherein the viscosity of the dispersion ranges from 500 to 20,000 mPa·s.

13. The aqueous dispersion as claimed in claim 1, wherein the N-vinylcarboxamide is N-vinylformamide, N-vinylacetamide, N-vinyl-N-methylacetamide or N-vinyl-N-methylformamide.

14. The aqueous dispersion as claimed in claim 1, wherein the polyalkylene glycol has the formula:

$$R1\!-\!(\!O\!-\!(\!R2\!-\!O)u\!-\!(\!R3\!-\!O)v\!-\!(\!R4\!-\!O)w\!-\!]_t\!A\!-\!(\!R5\!-\!O)x\!-\!(\!R6\!-\!O)y\!-\!R7\!-\!O)z\!-\!]_s R8)_n \quad \text{II}$$

where, independently of one another, $R^1$ is hydrogen, $C_1$–$C_{24}$-alkyl, $R^9$—C(=O)—, $R^9$—NH—C(=O)— or a polyalcohol radical; $R^8$ is hydrogen, $C_1$–$C_{24}$—alkyl, $R^9$—C(=O)— or $R^9$—NH—C(=O)—; $R^2$ to $R^7$ are (CH$_2$)$_2$—, (CH$_2$)$_3$—, —CH$_2$)$_4$—, —CH$_2$—CH(CH$_3$)—, —CH$_2$—H(CH$_2$—CH$_3$) or —CH$_2$—CHOR$^{10}$—CH$_2$—; $R^9$ is $C_1$–$C_{24}$-alkyl; $R^{10}$ is hydrogen, $C_1$–$C_{24}$-alkyl or $R^9$—C(=O)—; A is —C(=O)—O—, —C(=O)—B—C(=O)O— or —C(=O)—NH—B—NH—C(=O)—O—; B is —(CH$_2$)$_t$— or unsubstituted or substituted arylene; n is from 1 to 8; s is from 0 to 500; t from 1 to 12; u is from 1 to 5,000; v is from 0 to 5,000; w is from 0 to 5,000; x is from 1 to 5,000; y is from 0 to 5,000 and z is from 0 to 5,000.

15. The aqueous dispersion as claimed in claim 1, wherein the polyalkylene glycol is a low molecular weight polyalcohol derivative, wherein at least one of the hydroxyl groups forms an ether bond to a polyether radical P of the formula:

$$P = \left(\left(O\left(R2-O\right)_u\left(R3-O\right)_v\left(R4-O\right)_w\right)\!A\!\left(\left(R5-O\right)_x\left(R6-O\right)_y\left(R7-O\right)_z\right)_s R8\right)_r$$

n = 1 to 8

16. The aqueous dispersion as claimed in claim 1, wherein the amount of optional comonomer copolymerized with the at least one N-vinylcarboxamide ranges from 1 to 80% by weight of the total amount of copolymerized unsaturated monomer.

17. A method of paper-making, comprising:
    effecting the process of paper-making by employing the at least one water soluble polymer of at least one N-vinylcarboxamide according to claim 1 as a drainage aid, a flocculant, a retention aid, a wet and dry strengthening agent or a fixing agent.

18. An aqueous dispersion of water-soluble polymers, comprising:
    a water-soluble polymer comprising at least one polymer of at least one N-vinylcarboxamide, and, as a stabilizer, water-soluble crosslinked graft polymers which are prepared by the free radical polymerization of compounds having at least two ethylenically unsaturated double bonds in the presence of polyalkylene glycols.

19. A process for the preparation of aqueous dispersions of water soluble polymers of N-vinylcarboxamides, comprising:
    free radically polymerizing at least one N-vinylcarboxamide in an aqueous medium in the presence of at least one stabilizer, which is a water-soluble, crosslinked graft polymer which is prepared by free radical polymerization of at least one compound having at least two ethylenically unsaturated double bonds in the presence of at least one polyalkylene glycol.

* * * * *